(12) United States Patent
Handbury

(10) Patent No.: US 11,981,170 B2
(45) Date of Patent: May 14, 2024

(54) WINCH RIGGING LINK

(71) Applicant: MercuryPM Pty Ltd, Kilsyth (AU)

(72) Inventor: Stephen Handbury, Kilsyth (AU)

( * ) Notice: Subject to any disclaimer, the term of this patent is extended or adjusted under 35 U.S.C. 154(b) by 9 days.

(21) Appl. No.: 18/005,805

(22) PCT Filed: Oct. 8, 2021

(86) PCT No.: PCT/AU2021/051174
§ 371 (c)(1),
(2) Date: Jan. 17, 2023

(87) PCT Pub. No.: WO2022/073073
PCT Pub. Date: Apr. 14, 2022

(65) Prior Publication Data
US 2023/0271465 A1 Aug. 31, 2023

(51) Int. Cl.
*B60D 1/02* (2006.01)
*B60D 1/18* (2006.01)
(Continued)

(52) U.S. Cl.
CPC ............. *B60D 1/02* (2013.01); *B60D 1/185* (2013.01); *B60D 1/187* (2013.01); *F16G 11/14* (2013.01);
(Continued)

(58) Field of Classification Search
CPC .......... B60D 1/02; B60D 1/185; B60D 1/187; B60D 1/38; F16G 11/14; F16G 15/06;
(Continued)

(56) References Cited

U.S. PATENT DOCUMENTS 1,719,673 A * 7/1929 Rottmer ................. F16G 15/06
59/86
1,976,371 A 10/1934 Pritchett
(Continued)

FOREIGN PATENT DOCUMENTS

| EP | 3070369 A1 * | 9/2016 | ............ F16G 11/00 |
| FR | 2735198 A1 * | 12/1996 | ............ B63H 9/10 |
| WO | WO-2018200339 A1 * | 11/2018 | ............ F16G 11/12 |

OTHER PUBLICATIONS

International Preliminary Report on Patentability (Ch. II) dated Nov. 29, 2022 from PCT Application No. PCT/AU2021/051174.
(Continued)

*Primary Examiner* — Jermie E Cozart
(74) *Attorney, Agent, or Firm* — INNOVATION CAPITAL LAW GROUP, LLP; Vic Lin

(57) ABSTRACT

A winch rigging link has a body defining a cable retainer and a soft shackle retainer at opposite ends. The body has a length, a width less than the length, and a depth less than the width. Furthermore, the body defines opposing faces bounded by the length and width and spaced apart by the depth. The soft shackle retainer comprises a channel running widthwise across the soft shackle retainer an in between the faces. The channel defines a bearing surface having curvature in a lengthwise and widthwise plane. The cable retainer may be permanently attached to a winch cable and the soft shackle retainer attached to a soft shackle or the like when required for winch rigging. The configuration of the link maximises the bend radius of the soft shackle or the like retained by the soft shackle retainer, despite the relatively narrow profile of the body thereof.

26 Claims, 5 Drawing Sheets

(51) Int. Cl.
  *F16G 11/14* (2006.01)
  *F16G 15/06* (2006.01)
  *B60D 1/38* (2006.01)
  *B63B 21/10* (2006.01)
  *F16G 11/04* (2006.01)
  *F16G 11/12* (2006.01)

(52) U.S. Cl.
  CPC ................ *F16G 15/06* (2013.01); *B60D 1/38* (2013.01); *B63B 21/10* (2013.01); *F16G 11/046* (2013.01); *F16G 11/12* (2013.01); *Y10T 24/3916* (2015.01); *Y10T 24/3991* (2015.01); *Y10T 29/49948* (2015.01)

(58) Field of Classification Search
  CPC .. F16G 11/12; F16G 11/046; Y10T 29/49948; Y10T 24/3991; Y10T 24/3916; B63B 21/10
  See application file for complete search history.

(56) References Cited

U.S. PATENT DOCUMENTS

| | | | |
|---|---|---|---|
| 2,381,193 | A | 8/1945 | Vaszin |
| 3,048,909 | A | 8/1962 | Sheehan |
| 2017/0121154 | A1 | 5/2017 | Costa |

OTHER PUBLICATIONS

International Search Report & Written Opinion dated Dec. 2, 2021 from PCT Application No. PCT/AU2021/051174.

\* cited by examiner

SECTION M-M

SECTION N-N

WINCH RIGGING LINK

FIELD OF THE INVENTION

This invention relates generally to winch rigging link which, more specifically, may be attached to a conventional winch cable at one end and to a soft shackle at an opposite end.

BACKGROUND OF THE INVENTION

Many off-road vehicles are equipped with electric or hydraulic winches for towing and recovery operations. The winch reels in a winch cable typically of steel or synthetic rope. The cable is commonly terminated in a winch hook which may be attached to recovery straps.

However, conventional vehicle winch hooks can cut and fray recovery straps and may allow strap ends to escape therefrom during momentary slackness. Furthermore, the hook may be insufficient to hold two ends of a conventional recovery strap therein.

As such, alternatives arrangements include winch hooks comprising retainer gates to retain ends of recovery straps therein. Other arrangements include D-ring shackles having a larger opening to accommodate more than one end of a recovery strap.

These arrangements however are not without disadvantages and the present invention seeks to provide an alternative arrangement which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a winch rigging link having a body defining a cable retainer and a soft shackle retainer at opposite ends.

The body has a length, a width less than the length, and a depth less than the width. Furthermore, the body defines opposing faces bounded by the length and width and spaced apart by the depth.

The soft shackle retainer comprises a channel running widthwise across the soft shackle retainer an in between the faces. The channel defines a bearing surface having curvature in a lengthwise and widthwise plane.

In use, the cable retainer may be permanently attached to a steel or synthetic rope winch cable and the soft shackle retainer attached to a soft shackle or the like when required for winch rigging.

The channel running widthwise across the relatively narrow body of the link maximises the longitudinal bend radius of a soft shackle or the like engaged by the soft shackle retainer, thereby increasing the strain taking resilience of the soft shackle whilst also minimising the volume of the link. The channel may further comprise cross-sectional curvature with respect to a lengthwise and depthwise plane, thereby also increasing the transverse bend radius of the soft shackle.

For example, a minimum diameter of the bearing surface curvature in the lengthwise and widthwise plane to the width of the body ratio may be more than 0.5, preferably 0.75 or more. Furthermore, the minimum diameter of the bearing surface curvature may further be maximised despite the relatively narrow depth of the body wherein a minimum diameter of the bearing surface curvature in the lengthwise and widthwise plane to the depth of the body ratio may be more than 1.5.

As such, for example, the link may have a relatively large minimum bend diameter of approximately 60 mm, despite only having a width of approximately 80 mm and a depth of approximately 35 mm.

Furthermore, the link may be stowed with one face flat against a winch fairlead. The body of the link may have sufficient width to lie flat across openings in both Hawse and roller-type fairleads. At least one face may comprise rubberized bumpers to protect the fairlead plate and prevent movement of the link whilst stowed thereagainst. Furthermore, the widthwise running channel lies on a plane parallel with a surface of the winch fairlead which allows for soft shackle access without impingement even whilst stowed against the fairlead plate.

The cable retainer may comprise a shear pin similarly running widthwise, thereby able to retain a winch cable thimble orthogonally with respect to a soft shackle.

The body may narrow in the middle in the lengthwise and widthwise plane, thereby defining a substantial figure of eight or infinity symbol shape thereby reducing the overall weight of the link and providing ergonomic portions able to be more easily gripped and handled.

Winch rigging for recovery or towing application using the link may comprise pulling the winch cable and link attached thereto out from against the winch fairlead and inserting a looped end of a soft shackle through the channel and through two looped ends of a recovery straps prior strangulation of a knotted end of the soft shackle with the looped end, thereby defining a loop.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 3:
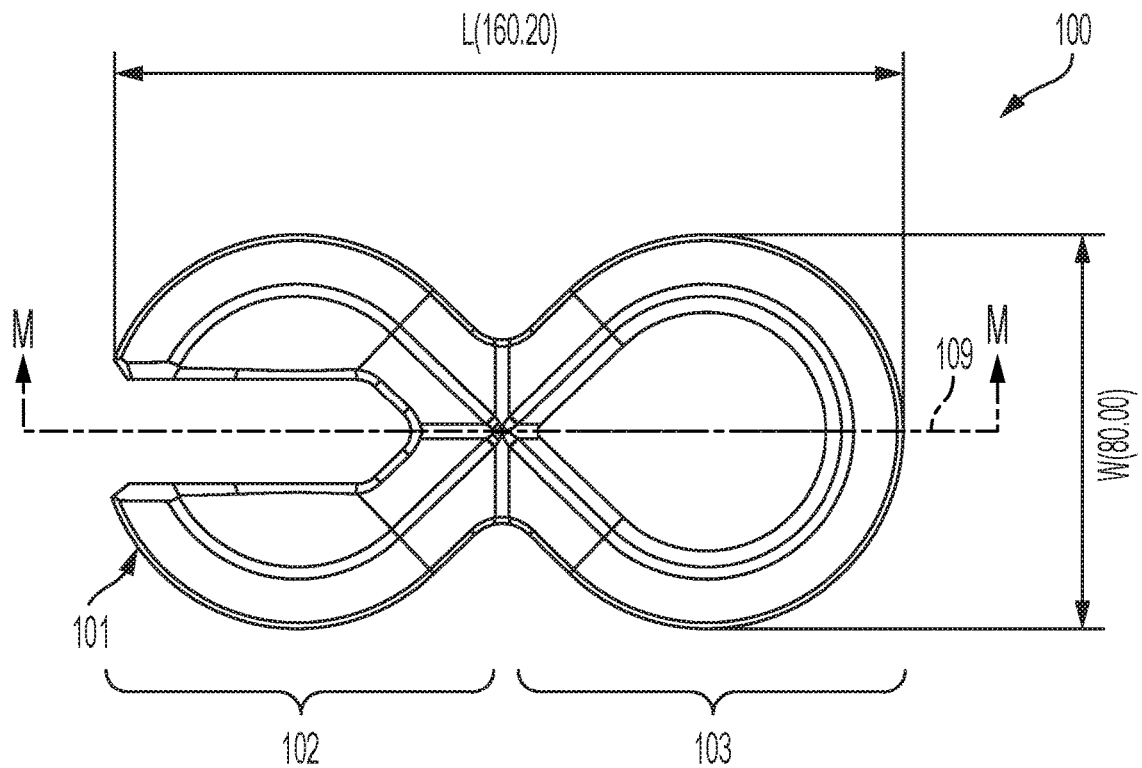
FIG. 3 shows a lengthwise and widthwise plane view of the link.

With reference to FIG. 3, a winch rigging link 100 has a body 101 defining a cable retainer 102 and a soft shackle retainer 103 at opposite ends. The body 101 has a length L, a width W less than the length L and, with reference to FIG. 4, a depth D less than the width W.

Figure 4:
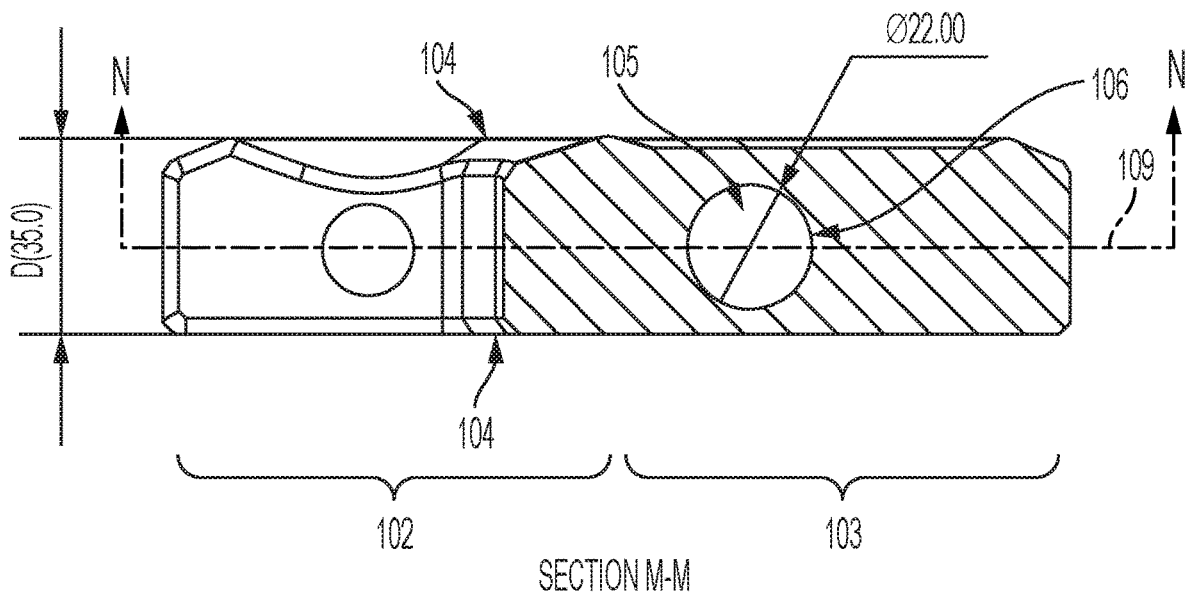
FIG. 4 shows a lengthwise and depthwise cross-sectional plan view of the link.

The length L and the width W define faces 104 spaced apart by the depth of D as indicated generally in FIG. 4.

Figure 5:
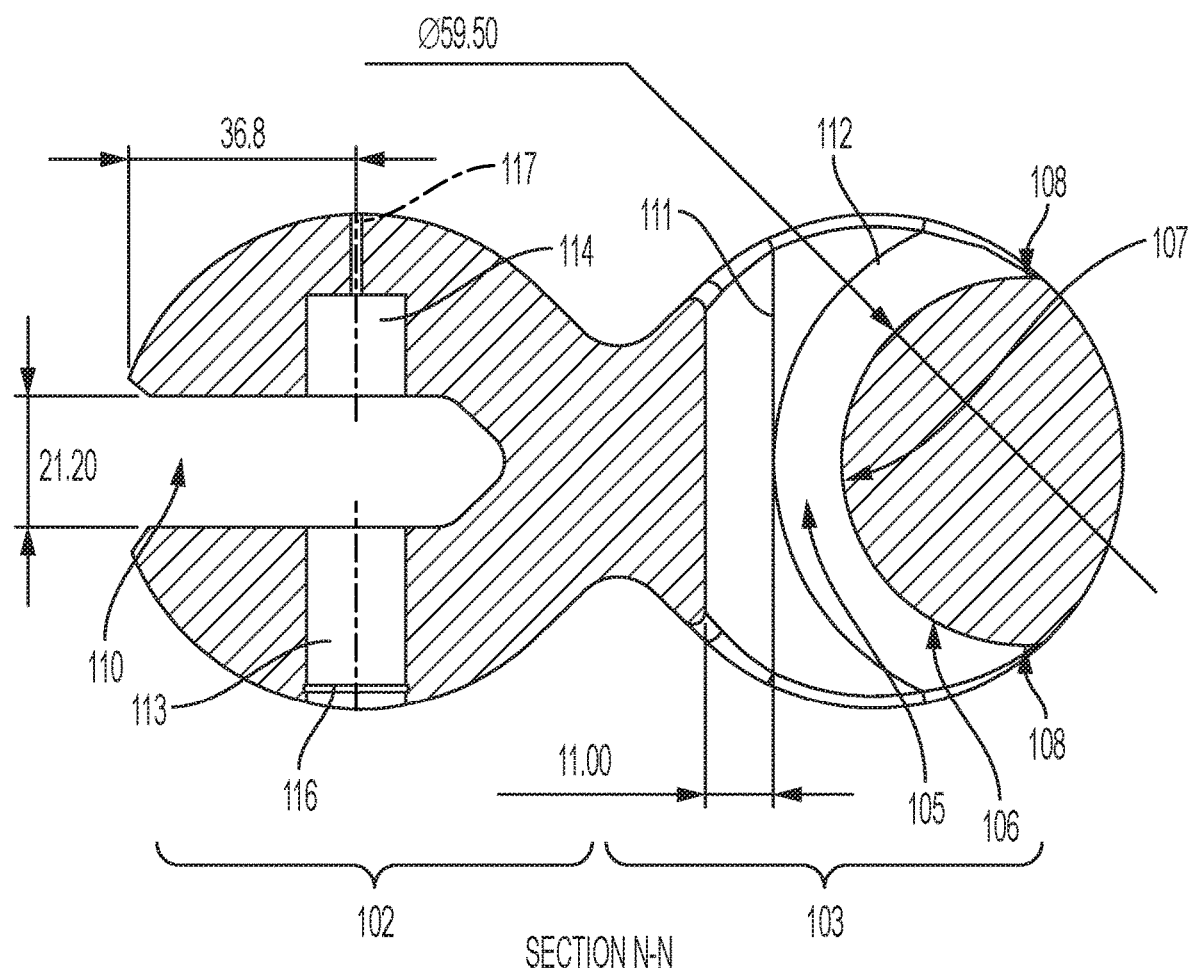
FIG. 5 shows a lengthwise and widthwise cross-sectional plan view of the link.

With reference to FIG. 5, the soft shackle retainer 103 comprises a channel 105 running widthwise across the soft shackle retainer 103 between the faces 104.

With reference to FIG. 5, the channel 105 defines a bearing surface 106 having curvature in a lengthwise and widthwise plane (i.e. the plane shown in FIG. 5). The curvature 106 may define an apex 107 towards the cable retainer 102 and ends 108 away from the cable retainer 102.

The ends 108 may be substantially parallel with a lengthwise axis 109 of the body 101.

The enlarged diameter of the bearing surface 106 increases the bend radius of a soft shackle engaged by the soft shackle retainer 103. In this regard, the diameter of the bearing surface 106 may be maximised given the width W of the body 101.

With reference to FIG. 5, a minimum diameter of the bearing surface 106 in the lengthwise and widthwise plane to the width W of the body 101 is preferably more than 0.5, further preferably greater than 0.6 and yet further preferably approximately 0.75 or more. FIG. 5 shows wherein the minimum diameter is approximately 59.5 mm whereas, with reference to FIG. 3, the width W is given as approximately 80 mm. As such, the ratio of the minimum diameter of the bearing surface 106 to the width W of the embodiment shown is approximately 0.75.

The diameter of the bearing surface 106 may further be maximised despite the narrowness (i.e. depth D) of the body 101. In this regard, a minimum diameter of the bearing surface 106 in the lengthwise and widthwise plane to the depth D of the body 101 ratio is preferably more than 1.5. According to the embodiment shown, a minimum diameter of approximately 59.5 mm as shown in FIG. 5 to the depth of approximately 35 mm shown in FIG. 4 gives a ratio of approximately 1.7.

With reference to FIG. 5, the curvature of the bearing surface 106 in the lengthwise and widthwise plane may have constant radius, thereby conferring a uniform bend radius to the soft shackle to enhance the strain taking capacity thereof.

The bearing surface 106 may further have cross-sectional curvature with respect to a lengthwise and depthwise plane (i.e. the plane shown in FIG. 4). The cross-sectional curvature may have a diameter of more than 20 mm, such as approximately 22 mm as shown in FIG. 4.

With reference to FIG. 5, the channel 105 may be shaped to define a straight axis 111 and a tangential curved axis 112. As such, the channel 105 has greater accessibility for inserting a looped end of a soft shackle therethrough.

The diameter of the channel 105 may be substantially less than the diameter of the bearing surface 106, such as less than half the diameter of the bearing surface 106. For example, as is shown in FIG. 4, the width of the channel 105 may be 22 mm whereas, with reference to FIG. 5, the diameter of the bearing surface 106 may be 59 mm. Furthermore, the channel 105 may be substantially long so as to curve (i.e., the length of the central axis 112) through the width W of the link 100 of approximately 80 mm.

Whereas the bearing surface 106 of the soft shackle retainer 103 may have curvature in the lengthwise and widthwise plane, a bearing surface of the cable retainer 102 may have curvature in the lengthwise and depthwise plane (i.e., orthogonally with respect to the bearing surface 106 of the soft shackle retainer 103).

The bearing surface of the cable retainer 102 may be defined by a shear pin 128.

In this regard, the cable retainer 102 may comprise an opening or channel 110 through the cable retainer 102 running depthwise (i.e., through the bearing faces 104 as compared to between the bearing faces 104).

Figure 1:
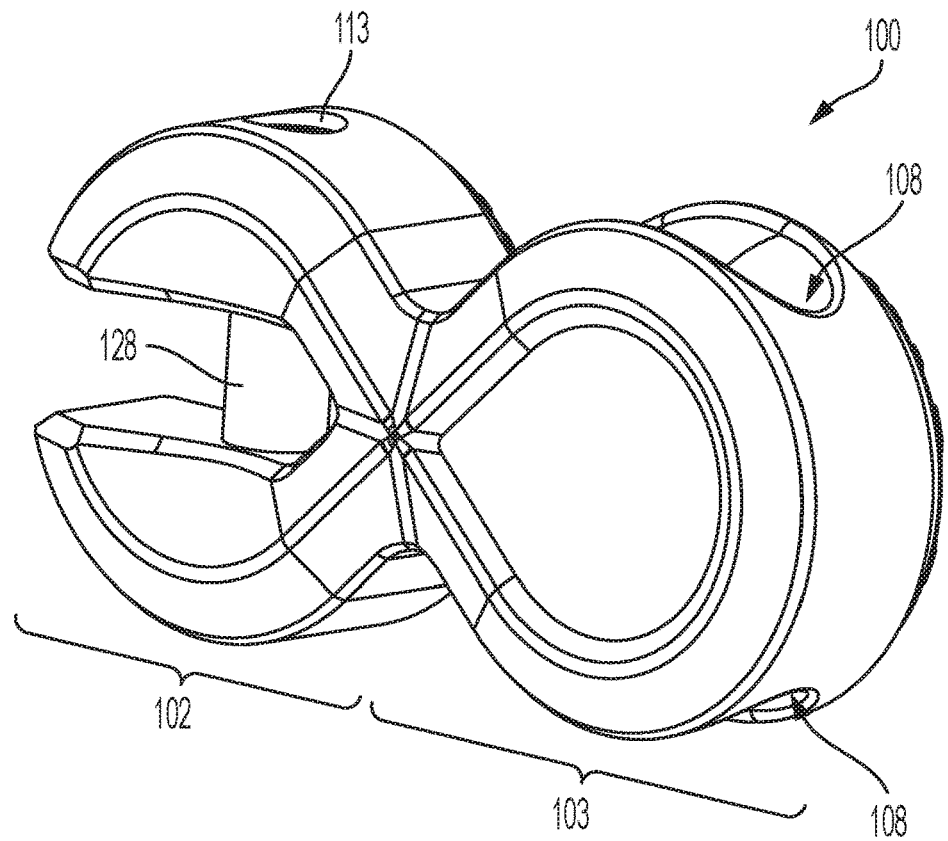
FIG. 1 shows a front perspective view of a winch link in accordance with an embodiment.
Figure 2:
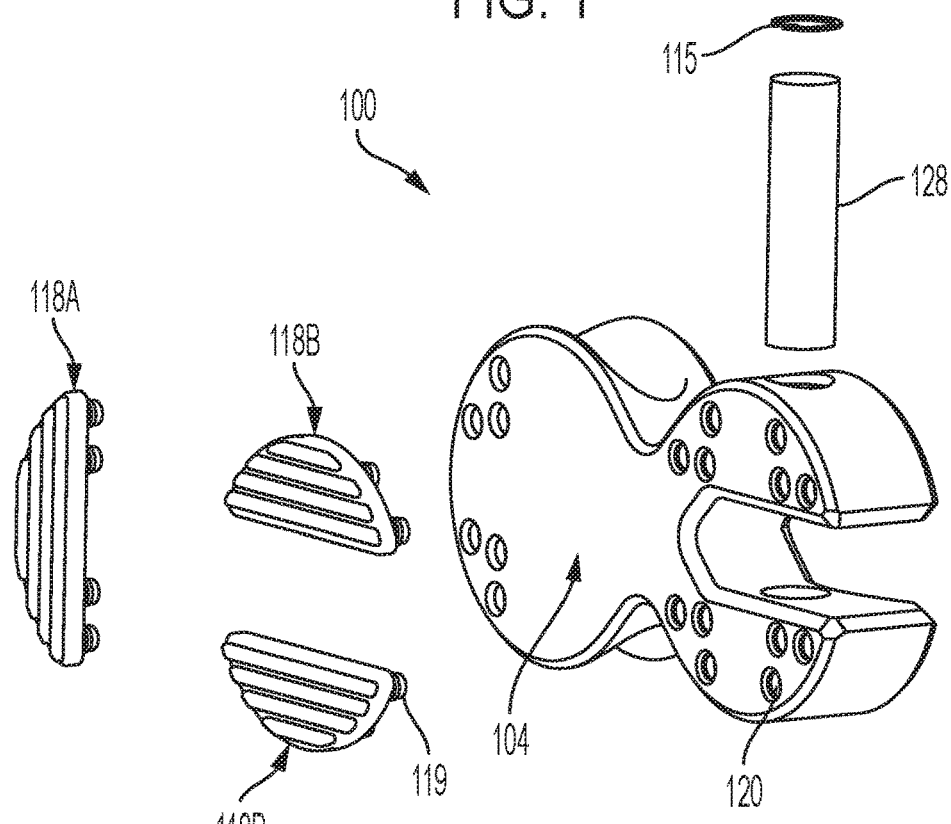
FIG. 2 shows a rear perspective disassembled view of the winch link.

With reference to FIG. 2, the cable retainer 102 may comprise a shear pin 128 across the opening 110. The shear pin 128 may run widthwise in between the bearing faces 104.

With reference to FIG. 2, the cable retainer 102 may be bifurcated with respect to the longitudinal axis 109 and comprise a through hole 113 in a first portion thereof for the insertion of the shear pin 128 therethrough and an inner blind hole 114 in a second portion thereof for an end of the shear pin 128. A circlip 115 may retain the shear pin 128 against a recessed edge 116 shown in FIG. 5. The blind hole 114 may lead to a relief channel 117.

With reference to FIG. 4, the bearing faces 104 may define parallel planes.

With reference to FIG. 2, the link 100 may comprise bumpers 118 in one or both faces 104. The bumpers 118 may comprise rubber and may be retained to the bearing face 104 with barbed tips 119 and corresponding apertures 120. The bumpers 118 may comprise a widthwise orientated bumper 118A for the soft shackle retainer 103 and a pair of longitudinal orientated bumpers 118B for each portion of the bifurcated cable retainer 102.

With reference to FIG. 5, the body 101 may narrow in the middle in the lengthwise and widthwise plane. As such, the body 101 may define a figure-of-eight or infinity symbol shape in the lengthwise and widthwise plane. Furthermore, each of the cable retainer 102 and the soft shackle retainer 103 may have a circular cross-section and the lengthwise and widthwise plane.

Figure 6:
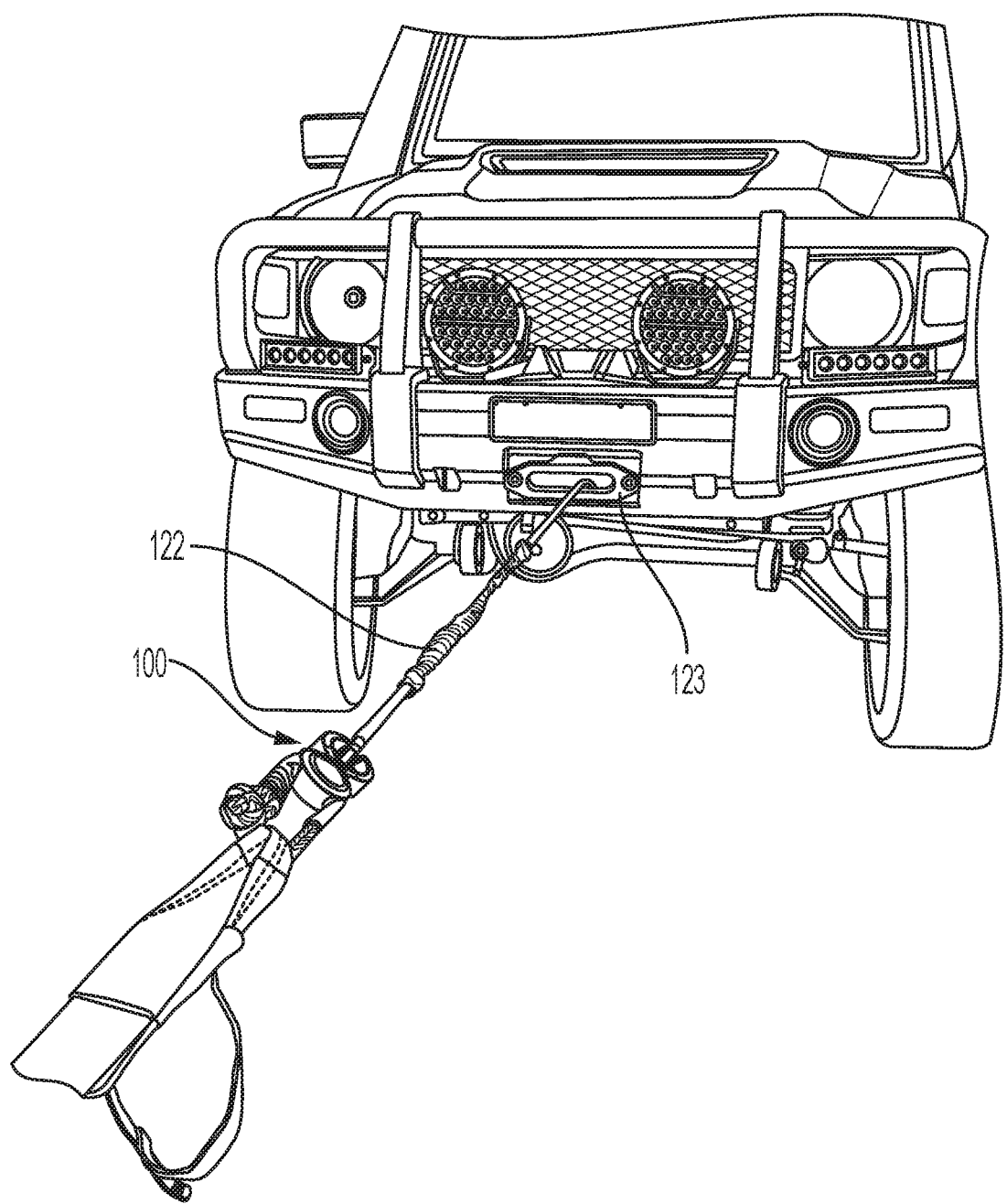
FIG. 6 illustrates recovery line rigging using the winch link.
Figure 7:
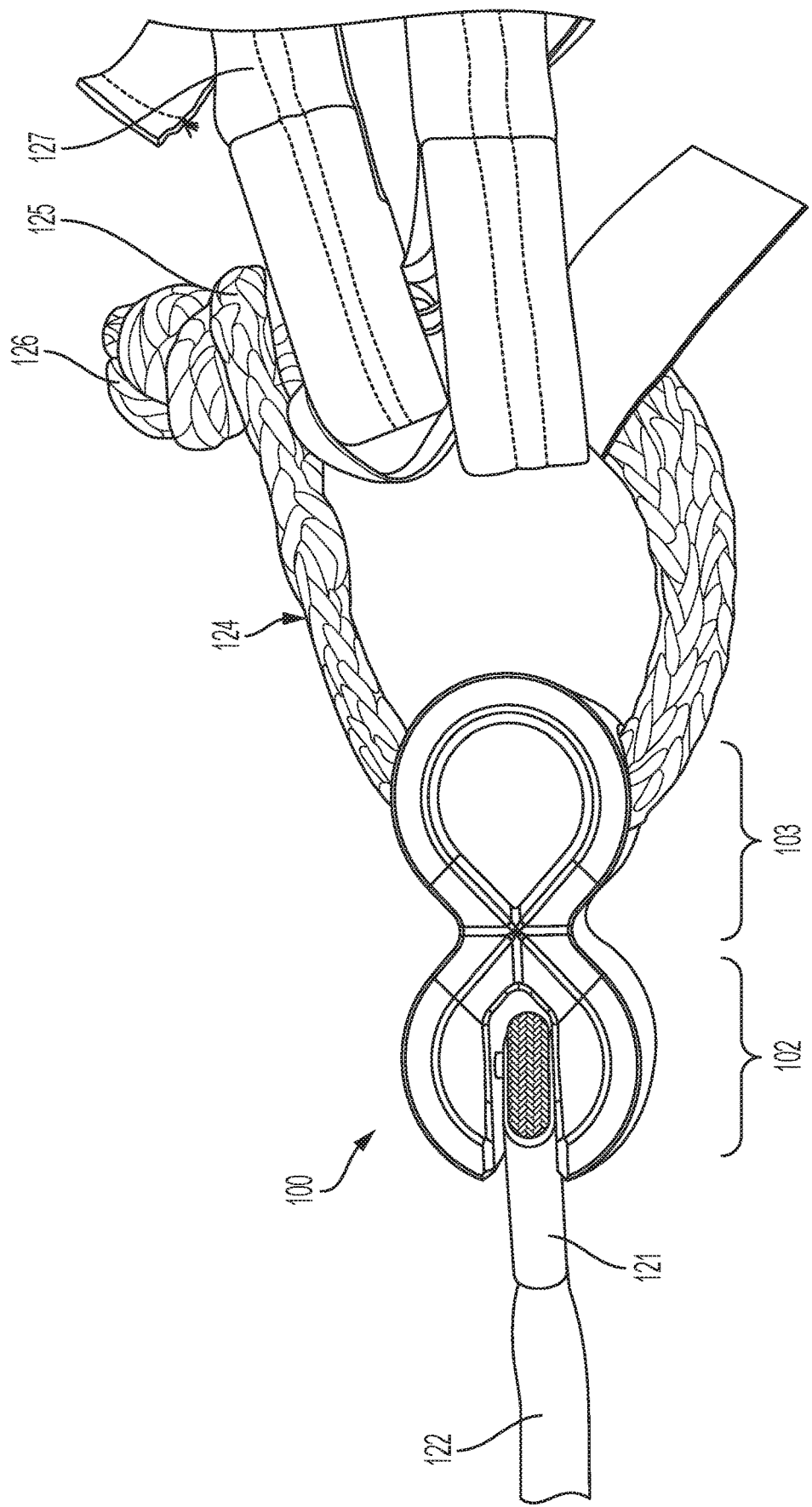
FIG. 7 illustrates the attachment of a soft shackle to the winch link.

FIGS. 6 and 7 illustrate the utilisation of the link for winch rigging.

With reference to FIG. 7, the link 100 may be permanently attached to a thimble 121 of a winch line 122 by removing the shear pin 128, inserting the thimble 121 into the opening 110 of the cable retainer 10 to and reinserting the shear pin 128. As alluded to above, the shear pin 128 is retained in position by the circlip 115. Furthermore, the shear pin 128 does not protrude out from beyond the body 101 when retained within the holes 113, 114.

The winch cable 122 may be a steel or synthetic rope winch cable. With reference to FIG. 5, the opening 110 may comprise a width of greater than 20 mm to accommodate most commercially available winch cable thimbles 121 therein.

The link 100 may be stowed by winching the link 100 against the fairlead 123 so that one of the bearing faces 104 lies flat against the fairlead 123. With reference to FIG. 3, the link 100 may have sufficient width to lie across the opening through the fairlead 123. In the embodiment shown in FIG. 6, the fairlead 123 is a Hawse-type fairlead 123 although the link 100 can alternatively lie flat against a roller-type fairlead. Preferably, only the bearing face 104 comprising the bumpers 118 lies against the fairlead 123.

For towing or recovery use, the winch line 122 may be pulled out from the fairlead 123 and a soft shackle 124 attached to the soft shackle retainer 103. Specifically, a looped end 125 of the soft shackle 124 is able to fit through the channel 105 whereafter the looped end 125 may strangulate a knotted end 126 of the soft shackle 124, thereby completing a loop.

Two looped ends of a retention strap 127 may engage the soft shackle 124.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A winch rigging link having a body defining a cable retainer and a soft shackle retainer at opposite ends, the body having a length, a width less than the length, and a depth less than the width, the body defining opposing faces bound by the length and width and spaced apart by the depth and wherein the soft shackle retainer comprises a channel running widthwise across the soft shackle retainer in between the faces, the channel defining a bearing surface having curvature in a lengthwise and widthwise plane and wherein the cable retainer comprises a widthwise pin removably insertable between bifurcated portions of the cable retainer and wherein the bifurcated portions are integrally formed as a single piece and fixed with respect to each other.

2. The link as claimed in claim 1, wherein the curvature defines an apex towards the cable retainer.

3. The link as claimed in claim 1, wherein the curvature terminates substantially parallel with a lengthwise axis of the body.

4. The link as claimed in claim 1, wherein a minimum diameter of the bearing surface curvature in the lengthwise and widthwise plane to the width of the body ratio is more than 0.5.

5. The link as claimed in claim 4, wherein the ratio is more 0.6.

6. The link as claimed in claim 4, wherein the ratio is approximately 0.75 or more.

7. The link as claimed in claim 1, wherein a minimum diameter of the bearing surface curvature is greater than 50 mm.

8. The link as claimed in claim 1, wherein a minimum diameter of the bearing surface curvature in the lengthwise and widthwise plane to the depth of the body ratio is more than 1.5.

9. The link as claimed in claim 1, wherein the curvature has constant radius.

10. The link as claimed in claim 1, wherein the bearing surface has cross-sectional curvature with respect to a lengthwise and depthwise plane.

11. The link as claimed in claim 10, wherein the cross-sectional curvature has a diameter more than 20 mm.

12. The link as claimed in claim 1, wherein the cable retainer defines a gap between the bifurcated portions of greater than 20 mm.

13. The link as claimed in claim 1, wherein the cable retainer comprises a through hole in a first bifurcated portion thereof for the insertion of the pin therethrough and an inner blind hole in second bifurcated portion thereof for an end of the pin.

14. The link as claimed in claim 1, wherein the channel defines a straight axis and a tangential curved axis.

15. The link as claimed in claim 1, wherein the body narrows in the middle thereof in the lengthwise and widthwise plane.

16. The link as claimed in claim 15, wherein the body defines a figure-of-eight cross sectional shape in the lengthwise and widthwise plane.

17. The link as claimed in claim 16, wherein each of the cable retainer and the soft shackle retainer have circular cross sections on the lengthwise and widthwise plane.

18. The link as claimed in claim 1, wherein the opposing faces define parallel planes.

19. The link as claimed in claim 1, wherein a diameter of the channel is less than a diameter of the bearing surface.

20. The link as claimed in claim 19, wherein the diameter of the channel is less than half the diameter of the bearing surface.

21. A method of wing rigging using the link as claimed in claim 1, the method comprising attaching a winch cable to the cable retainer and attaching a soft shackle to the soft shackle retainer so that the soft shackle runs widthwise across the soft shackle retainer.

22. The method as claimed in claim 21, wherein attaching a soft shackle to the soft shackle retainer comprises inserting a looped end of the soft shackle through the channel of the soft shackle retainer and strangulating a knotted end of the soft shackle with the looped end.

23. The method as claimed in claim 21, further comprising stowing a face of the link flat against a winch fairlead so that the channel lies on a plane parallel with a surface of the winch fairlead.

24. A system comprising:
the winch rigging link as claimed in claim 1,
a fairlead; and
a winch line passing through the fairlead, wherein:
  the winch line is attached to the cable retainer of the winch rigging link by the pin; and
  a soft shackle is attached through the channel of the soft shackle retainer.

25. A method comprising:
attaching a winch line passing through a fairlead to the pin of the cable retainer of the winch rigging link as claimed in claim 1; and
attaching a soft shackle through the channel of the soft shackle retainer.

26. The method as claimed in claim 25, further comprising pulling one of the faces of the winch rigging link against the fairlead using the winch line.

* * * * *